F. H. CHASE.
EARTH AUGER.
APPLICATION FILED FEB. 16, 1910.
1,004,242.
Patented Sept. 26, 1911.
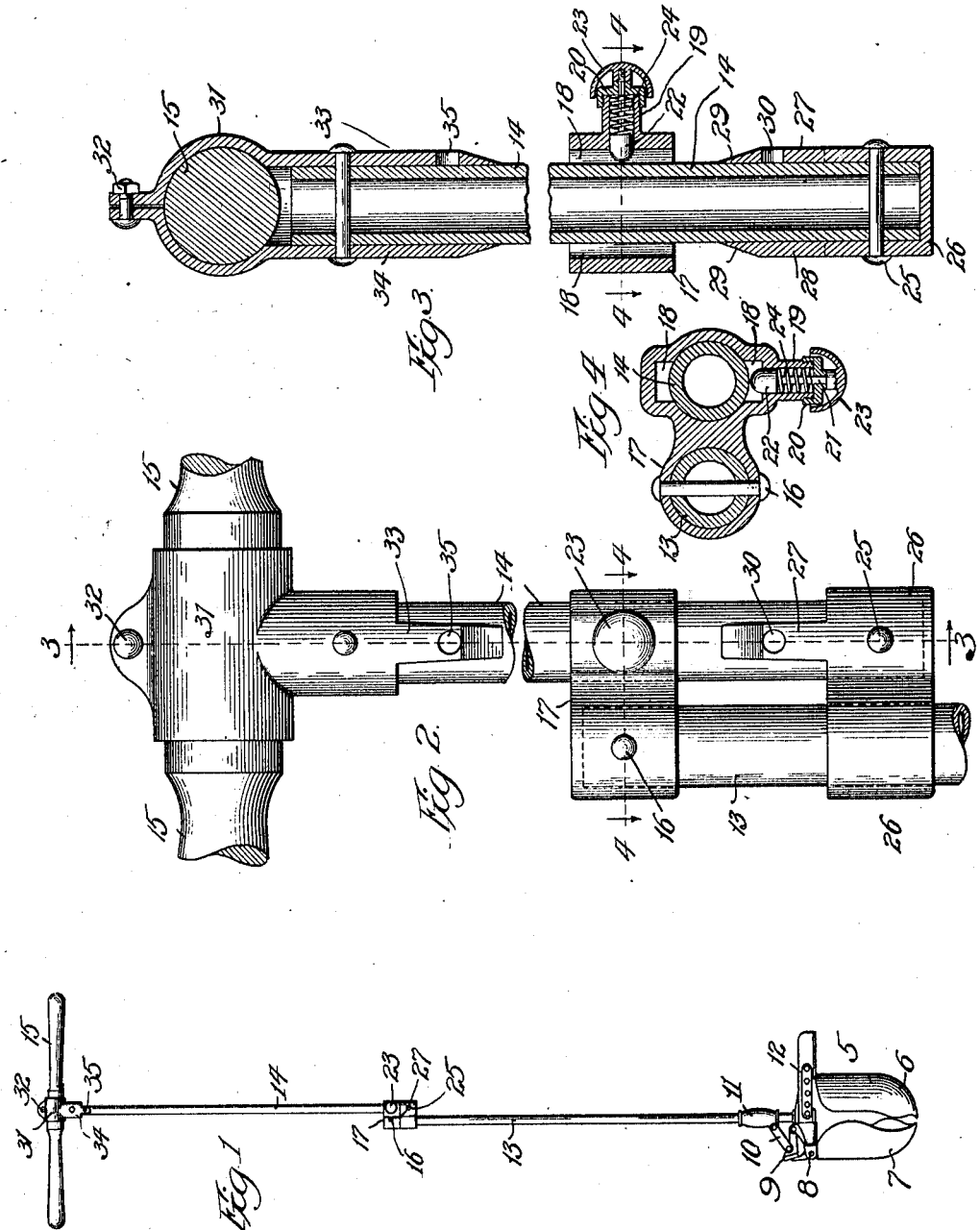

UNITED STATES PATENT OFFICE.

FRANK H. CHASE, OF CHICAGO, ILLINOIS, ASSIGNOR TO THE STANDARD EARTH AUGER CO., OF CHICAGO, ILLINOIS, A CORPORATION OF ILLINOIS.

EARTH-AUGER.

1,004,242. Specification of Letters Patent. Patented Sept. 26, 1911.

Application filed February 16, 1910. Serial No. 544,300.

*To all whom it may concern:*

Be it known that I, FRANK H. CHASE, a citizen of the United States, residing at Chicago, in the county of Cook and State of Illinois, have invented certain new and useful Improvements in Earth-Augers, of which the following is a specification.

My invention relates to earth augers, and one of the objects of the invention is to provide an earth auger of any approved type with an extensible stem which can be shortened or lengthened to maintain the handle which is secured to the stem, at a convenient height both when boring shallow and deep holes.

Another object is the provision of locking means for an extensible stem of this character, whereby the stem will be automatically locked in both its extended and retracted positions, which can be easily and readily unlocked by the operator when it is desired to change the length of the stem, and which will not be liable to become accidentally unlocked when the auger is in use.

A further object is the provision of an extensible stem and a lock therefor, which shall be strong, durable, simple in construction, and light in weight.

In the accompanying drawings illustrating a preferred embodiment of my invention—Figure 1 is an elevation of an earth auger embodying my invention. Fig. 2 is an enlarged elevation of the locking means. Fig. 3 is a section on the line 3—3 of Fig. 2, and, Fig. 4 is a section on the line 4—4 of Fig. 2.

Referring to the drawings, 5 designates an auger head of any approved or preferred construction, but I have shown for the purposes of illustration, a head comprising a rigid blade 6, a pivoted blade 7 pivotally mounted at 8 and adapted to be held in closed position by a cam-lock 9 connected by a link 10 to the sliding sleeve 11, the pivoted cam-lock, link, and sleeve, comprising a gravity actuated locking means. The head is also shown as provided with an adjustable expansion reaming blade 12 whereby a hole of any desired size may be bored. It will be understood, however, that my invention is not confined in its use, to auger heads of the type herein disclosed, but is capable of application to any desired or preferred form of implement.

For convenience in using earth augers, it is very desirable that the stem be capable of variation in length for the reason that the tool can be operated to the best advantage when the handle is at a height which is convenient for the operator to grasp. In starting a hole the handle should be nearer the auger head so that the operator will not be obliged to reach upwardly in order to manipulate the auger, and when a hole of considerable depth has been bored it is essential that the handle be lengthened so that the operator will not be obliged to stoop to an uncomfortable position to grasp and manipulate the handle. Furthermore, very deep holes such as are necessary for setting telephone posts, for instance, can not be bored with an auger provided with a stem of the usual length because the ordinary length of a stem is not as great as the depth of the hole, and it accordingly becomes necessary to have a second auger provided with an exceptionally long stem to bore the bottom of the hole. In order to overcome this objectionable feature in the ordinary earth auger, I have provided an extensible stem comprising longitudinally slidable sections 13 and 14; the lower end of the section 13 being attached to the auger head and the upper end of the section 14 being provided with the usual operating handle 15. These sections are preferably constructed of gas pipe although it will be obvious that wood or any other preferred material may be employed if desired.

The upper end of the section 13 has secured thereon, preferably by a rivet 16, a cap 17 having an integral lateral extension forming a sleeve or collar adapted to receive and to slide longitudinally of the section 14. This sleeve as best shown in Fig. 4, is extended on either side to form the slots or grooves 18 outside the section 14 and extending longitudinally thereof, as shown in Fig. 3. A hollow, laterally projecting stud or tube 19 is formed integral with the sleeve and adjacent to and connecting with one of the slots 18. The hollow stud is threaded at its outer end for the engagement therewith of a screw-cap 20, through which extends the stem 21 of a latch having an enlarged inner locking end 22 adapted to extend into the slot 18, and also provided with a hemispherical knob on its outer end adapted to be grasped by the hand of the operator to withdraw the inner end from the slot 18 against the force of the expansion spring 24.

The lower end of the section 14 has secured thereto by a rivet 25 or other preferred fastening means, a cap 26 also provided with a laterally extending sleeve adapted to receive and to slide longitudinally of the section 13. The cap 26 is provided with a plurality of upwardly extending fingers 27 and 28, both beveled off at their upper edges as at 29, and the finger 27 having a recess 30 therein adapted to receive the locking end 22 of the spring-pressed lock, when the fingers 27 and 28 are slid longitudinally into the slots 18 in the sleeve 17. It will be evident that when the sections 13 and 14 are moved into their extended positions as shown in Fig. 1, the fingers 27 and 28 will be brought into registration with the slots 18 and that the spring-pressed lock will be engaged in the recess 30 to lock the sections against relative longitudinal movement. The fingers 27 and 28 fit comparatively snugly within the slots 18 and serve to prevent relative turning movement between the sections 13 and 14. When it is desired to shorten the handle, the spring-pressed lock is withdrawn by the operator and the upper section 14 is slid along down the lower section 13.

In order to lock the two sections in their retracted or overlapped position to provide an implement with a short handle, the head or T 31, which is secured upon the upper end of the section 14 and in which the handle 15 is securely clamped by means of the bolt 32, is provided with a plurality of downwardly extending fingers 33 and 34 located in alinement with the slots 18 of the sleeve 17, the finger 33 being provided with a recess 35 for the reception of the spring-pressed locking member 22 when the fingers are engaged in the slots 18. The engagement of the locking member with the recess in the finger 33 will securely lock the sections of the stem in their retracted position to provide a short stem for the auger.

It will be evident that the lock which is carried by the section 13, is adapted to automatically engage with the recessed fingers at either end of the section 14 to lock said section in either its extended or retracted position, the beveled or inclined ends of the fingers sliding under the spring-pressed member and forcing it outward until the recess is in alinement therewith, whereupon the locking member engages in the recess, securely locking the members 13 and 14 against relative longitudinal movement. It will also be noted that the upper section 14 is offset relatively to the axis of the auger head which is coincident with the axis of the section 13.

I have shown and described a preferred embodiment of my invention, but it will be understood that variations in size, proportion, and minor mechanical details, may be resorted to without departing from the spirit of the invention, therefore, I do not wish to restrict myself to the exact construction shown.

What I claim is:

1. In an earth auger, the combination of, a head, a stem comprising a plurality of sections, a sleeve rigidly secured upon each section and adapted to slidingly engage the other section, whereby said sections are slidingly connected one to the other, and a lock carried by one of said sleeves and adapted to coöperate with the other sleeve to lock said sections against longitudinal movement.

2. In an earth auger the combination of a boring head and an adjustable stem comprising a plurality of sections, a sleeve fixedly secured upon the end of each of said sections and loosely embracing the other section whereby said sections are slidably connected together and offset one from the other, and means carried by said sleeves and adapted to interengage upon the approach of the sleeves to prevent relative movement between the sections.

3. In an earth auger, the combination of a boring head, and an adjustable stem comprising a plurality of sections, a sleeve fixedly secured upon each of said sections and loosely embracing the other section, whereby the sections are slidably connected together and offset one from the other, one of said sleeves having an internal groove extending longitudinally of the section embraced thereby, and a finger projecting from the other sleeve to engage the said groove and prevent relative angular movement of the sections.

4. In an earth auger, the combination of a boring head, and an adjustable stem comprising a plurality of sections, a sleeve fixedly secured upon each of said sections and loosely embracing the other section, whereby the sections are slidably connected together and offset one from the other, one of said sleeves having an internal groove extending longitudinally of the section embraced thereby, and a finger projecting from the other sleeve to engage in said groove and prevent relative angular movement of the sections, and a lock disposed upon one of said sleeves to enter the groove in the sleeve and engage with the said finger in the groove to lock the sections against relative longitudinal movement.

5. In an earth auger, the combination of a boring head, and an adjustable stem comprising a plurality of sections, the lower end of one of said sections being secured to the head, a sleeve fixedly secured upon the upper end of said section and having a laterally projecting portion adapted to slidingly embrace the other section, said portion having oppositely disposed longitudinal grooves, a sleeve fixedly secured to the lower end of the other section and having a laterally projecting portion adapted to slidingly embrace the first named section, said fixed portion of the sleeve having fingers projecting longitudinally of the section and adapted to fit within the grooves on the other sleeve and a latch carried by said grooved sleeve and adapted to engage with said fingered sleeve to prevent relative longitudinal movement of the sections.

6. In an earth auger, the combination of a boring head, and an adjustable stem comprising a plurality of sections, the lower section being secured to said head, a grooved sleeve fixedly secured to the other end of said section and slidingly embracing the upper section, a sleeve provided with fingers rigidly secured to the lower end of said upper section and slidingly embracing the lower section, a head provided with fingers fixedly secured to the other end of said upper section, a handle carried by said head, the fingers of said head and fingered sleeve being adapted to fit within the grooves of said grooved sleeve, and means adapted to engage with the fingers on said fingered sleeve to lock the stem in extended position and to engage with the fingers on said head to lock the stem in retracted position.

FRANK H. CHASE.

Witnesses:
I. J. WILSON,
WM. O. BELT.

---

Copies of this patent may be obtained for five cents each, by addressing the "Commissioner of Patents, Washington, D. C."